United States Patent

Posselt

[11] 3,909,343
[45] Sept. 30, 1975

[54] APPARATUS FOR FORMING A LAMINATE IN A HEATED-PLATEN PRESS

[75] Inventor: Manfred Posselt, Viersen, Germany

[73] Assignee: G. Siempelkamp & Co., Krefeld, Germany

[22] Filed: Apr. 5, 1973

[21] Appl. No.: 348,013

[30] Foreign Application Priority Data
Apr. 11, 1972 Germany............................ 2217396

[52] U.S. Cl. ................ 156/538; 100/215; 156/583; 198/180
[51] Int. Cl.² ................ B30B 15/30; B30B 15/34; B32B 31/00
[58] Field of Search ............ 100/215; 156/538, 576, 156/583; 198/180

[56] References Cited
UNITED STATES PATENTS

| | | | |
|---|---|---|---|
| 3,463,299 | 8/1969 | Poole | 198/179 |
| 3,577,834 | 5/1971 | Lang | 93/58.3 |
| 3,758,365 | 9/1973 | Schilling | 156/538 |
| 3,809,390 | 5/1974 | Lenoir | 271/204 |

Primary Examiner—Charles E. Van Horn
Assistant Examiner—Robert A. Dawson
Attorney, Agent, or Firm—Karl F. Ross; Herbert Dubno

[57] ABSTRACT

A stack of thermally bondable sheets supported on a table adjacent a platen press is gripped along two opposite edges by a pair of jaws carried on a carriage which is displaced horizontally to position the stack between the heated platens of the press. The platens are closed to hot-press the stack and the jaws continue to hold the stack by its edges at least until the press is closed. After pressing, the stack, in the form of an integral stiff board, is again gripped by the edges which project beyond the press surface and is displaced from between the platens.

6 Claims, 5 Drawing Figures

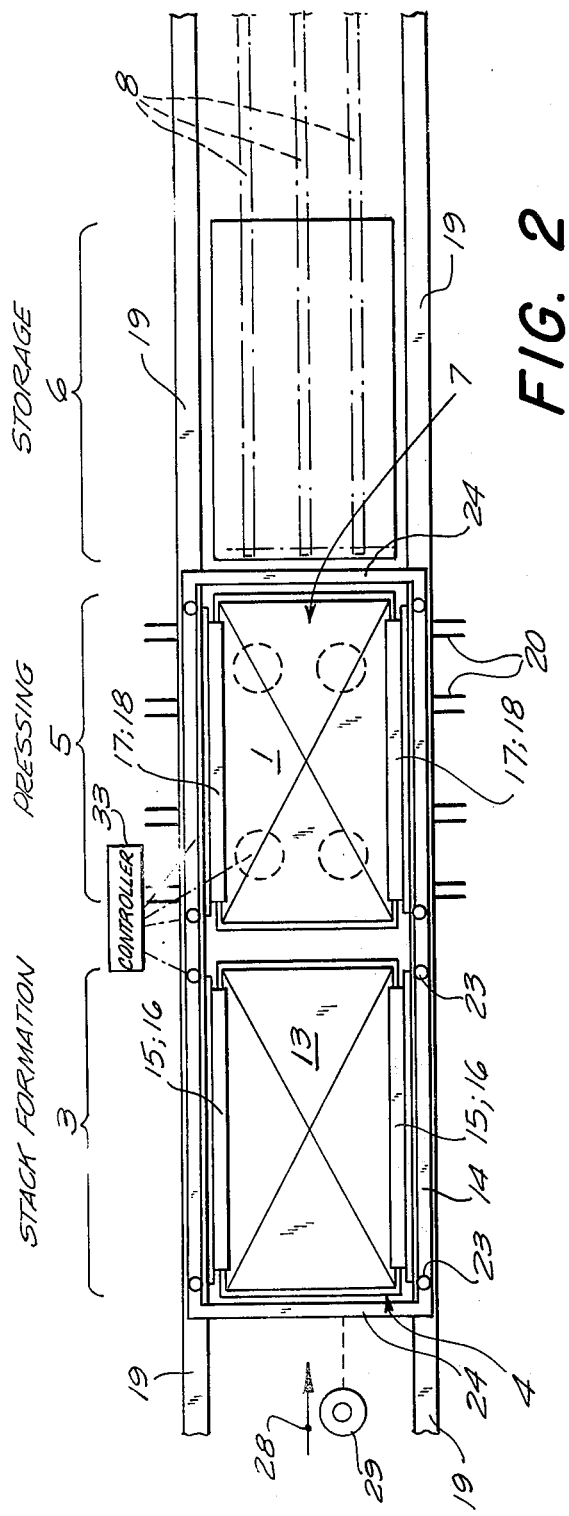
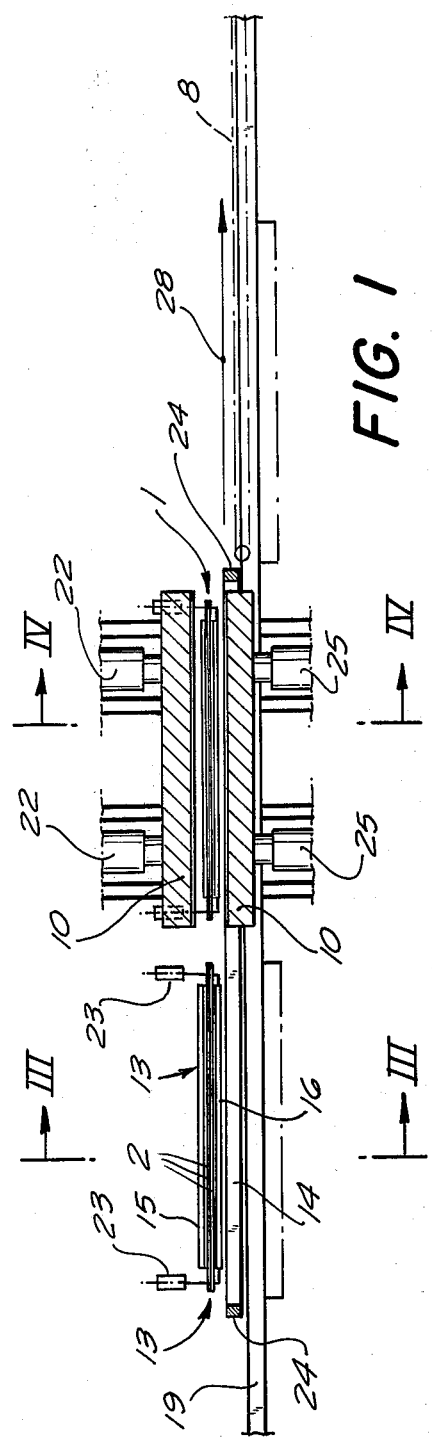

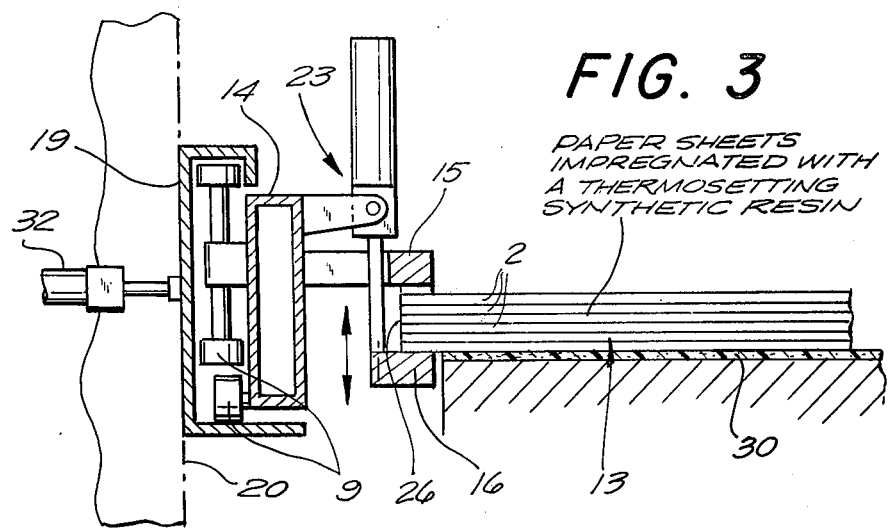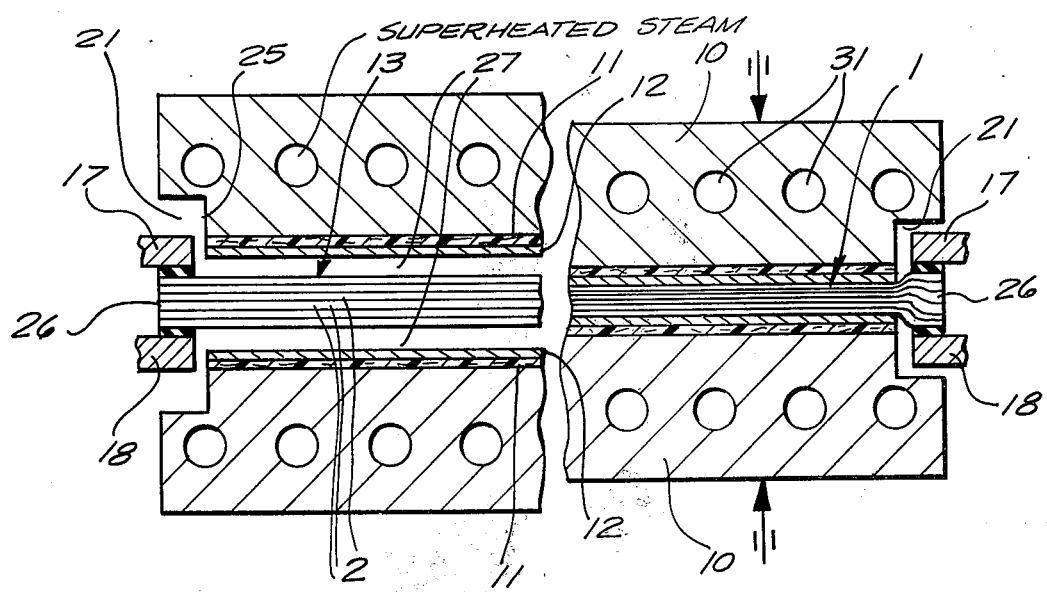

APPARATUS FOR FORMING A LAMINATE IN A HEATED-PLATEN PRESS

FIELD OF THE INVENTION

The present invention relates to a system for making a laminate and more particularly, to a method of and an apparatus for making laminate boards in a heated-platen press.

BACKGROUND OF THE INVENTION

The production of a laminate board is comprised of at least two steps: the formation of a stack of care, decor, and overlay sheets or "papers" and the pressing-together of this stack into a coherent single board. In one of the best-known systems a stack of sheets impregnated with a synthetic-resin heat-activatable adhesive is formed directly in the cold press, the press is then closed on the stack and the platens of this press are heated. Thereafter the press is cooled and opened and the pressed stack is removed. Multiplaten presses are used in such systems to increase output.

This method is disadvantageous because the alternate heating and cooling of the press is wasteful of energy, damaging to the press platens, and time consuming. In addition the formation of the stack directly in the press means that this press is idle for an inefficiently long time.

An effort to overcome these disadvantages has been made by forming the stack outside the press and then loading it into a platen press by the use of charging trays or of so-called conveyor pallets which are displaceable conveyors which each have an endless belt driven synchronously in the direction opposite that in which the pallet is withdrawn from between the platens so as to deposit the material neatly on an underlying surface (i.e. without relative movement of conveyor-belt surface and the receiving surface). Such pallets are expensive and troublesome to use. In addition they often mar the surfaces of the stack and can misalign the various stacked sheets. The facing lamina or veneer is often very delicate and must be handled with extreme care. This is especially the case when fast-acting thermosetting impregnating resins are used since the portions of the stack first to contact the platen surface may set and cure even before pressure is applied between the platens or the rest of the stack is deposited. The resulting product is often mottled or irregular as a consequence of this gradual contact of the stack surface with the hot platen.

In another attempted solution the stack is formed on a support sheet (charging tray) usually made of aluminum or stainless steel. Then this support sheet and the stack is loaded into the press. With such an arrangement the support sheet also must be heated, thereby slowing production, while the face of the stack on the sheet may be subjected to less heat than the other face which will immediately be contacted by a hot platen. The handling of the charging trays, moreover, reduces efficiency by introducing nonproductive steps with the laminate-forming operation.

OBJECTS OF THE INVENTION

It is therefore an object of the present invention to provide an improved system for making a laminate, especially from a stack of sheets or papers impregnated with or coated with a thermosetting resin and including a core paper, a decorative printed paper overlying the core paper and a transparent protective overlay, with or without intervening sheets or papers.

Yet another object is to provide an improved apparatus which allows a stack of sheets to be loaded rapidly into a heated-platen press without damaging any of the sheets or misaligning them.

A further object is to provide such an apparatus which allows a pressed stack to be removed from the press without scratching it.

SUMMARY OF THE INVENTION

I attain these objects according to the present invention in a system wherein the stack of sheets is formed outside the press, is gripped along its longitudinal edges, i.e. those edges parallel to the direction of displacement of the stack into the press, and is displaced longitudinally in the press. The hot platens (heated continuously) are closed on the stack to activate the adhesive or thermally activatable resin impregnating the stack and press this stack into a unitary laminate board. Thereafter the platens are opened and the stack, now a board, is gripped by the edges which during this entire operation have projected transversely from the press and is displaced out from between these platens and laid on a downstream unloading table.

In accordance with another feature of this invention the stack is gripped by two pairs of longitudinally elongated jaws which are mounted on a carriage displaceable in the transport direction. As a matter of convenience these jaws are arranged in two sets. In one operation the upstream set closes on a pressed stack and the downstream set closes an unpressed stack, then the whole carriage is displaced to move the pressed stack out of the press and the unpressed stack into the press. The longitudinal edges project from the press and beyond the edges of the stack-forming table to permit these jaws to get a good grip. Of course, the jaws on each side of the press may be formed as continuous clamping bars running from the press to the loading table upstream of the press.

Such an arrangement allows the stack to be moved without misaligning its sheets and without touching the central region of either of its faces. The press platens are constantly maintained hot and are closed on the stack which is held equidistant between them by the jaws as they close. Thus the entire stack is heated to the same extent. This feature is important when quick-setting synthetic-resin adhesives, such as phenol or urea formaldehydes, are used.

DESCRIPTION OF THE DRAWING

The above and other objects, features, and advantages of the invention will become more readily apparent from the following description, reference being made to the accompanying drawing in which:

FIG. 1 is a longitudinal section through the apparatus according to the present invention;

FIG. 2 is a top view of the apparatus;

FIG. 3 is a detail sectional view taken along line III—III of FIG. 2; and

FIGS. 4A and 4B are sections corresponding to line IV—IV of FIG. 2 showing the press in the open and closed position, respectively.

SPECIFIC DESCRIPTION

As shown in FIGS. 1 and 2 a stack 13 of resin-impregnated sheets 2 is formed on a table 4 at a station 3. Thereafter the stack is transported between the platens 10 of a press 7 in a pressing station 5 and formed into a board 1 which is thereafter displaced into a storage station 6 wherein the finished cooled board is carried away by belts 8. A plurality of boards 1 can be formed by separating superposed stacks 13 by layers of material to which the sheets 2 will not adhere.

A pair of horizontal fixed beams 19 flank the stations 3, 5, and 6 and define a transport direction 28 through these stations. These beams 19 act as guides for a carriage 4 formed by longitudinal beams 14 and crosspieces 24 together forming a closed rectangular frame which is supported on rollers 9 within the beams 19 and which is longitudinally displaceable back and forth in the direction 28 by a motor 29.

The carriage 4 is provided at its downstream end with a pair of longitudinally elongated loading jaws 15 and 16, the latter of which is vertically displaceable relative to the former by means of a pair of hydraulic cylinders 23. As best seen in FIG. 3 the stack 13 has its longitudinal edges 26 projecting laterally beyond the longitudinal edge of the stacking table 4 so that the jaws 15 and 16 can grip this edge and displace the stack. The table 4 is covered with a soft material layer 30 such as felt so that the stack 13 can slide on it without being scratched. The upper level of this table 4 is above the level of the lower press platen in the open position of the press 5. The carriage 4 is provided at its upstream end with another two sets of unloading jaws 17 and 18 identical to the jaws 15 and 16 and which operate in the same manner.

The press platens 10 are each covered by a resilient layer 11 of a heat-resistant synthetic resin in turn faced with a thin glossy stainless-steel sheet 12 which engages the stack 13. Each platen is formed with a network of passages 31 through which superheated steam is passed to maintain the platens 10 at 200+°C. The edges of the platens are recessed at 21 so that they can close with the clamp 17, 18 still closed on the edge 26 of the stack 13 and insure a complete heating of the clamped stack right up to the platens edge. In this manner the width of the platens 10 at their faces 12 is the same as the width of the table 4 transverse to direction 28 so that the board 1 will be pressed over this area. The edges 26 are, of course, trimmed off in a subsequent operation. While the described system shows clamps engaging the longitudinal edges of the stack, it should be noted that engagement of the transverse edges is also within the purview of the invention.

The cylinders 22 displacing the upper platen 10 down and the cylinders 25 displacing the lower platen 10 up can be replaced by mechanism shown in FIG. 1 at 20 for shifting the rails 19 upwardly and displacing only the lower platen up. The cylinders 22, 23, and 25 as well as the motor 29 are all operated according to a predetermined program by a controller 33. The lifting speed of the rails is half that of the lower platen in this case. Thus both platens 10 contact the stack simultaneously from opposite sides. In both systems the stack 13 is held equidistant from the two platens with equal space 27 to each side as the press is closed. In addition, cylinders 32 operating to displace the jaws 15–18 transversely to the direction 28 are provided so as to hold the stack 13 taut, thereby preventing it from sagging.

In operation a stack 13 of sheets 2 is formed on the table 4 with its edges 26 overhanging the table longitudinal edges. The carriage is displaced into its illustrated upstream position and the jaws 15, 16 are closed on the stock and then this carriage 4 is displaced downstream until the stack 13 is between the platens 10. The press is then closed to hot-press the stack into a unitary board 1. After the press is closed the jaws are opened and the carriage 4 is again moved all the way upstream. Its jaws 17 and 18 are then brought over the edges 26 of the board 1 in the press and the jaws 15 and 16 embrace the edges of the next stack 13. These jaws are all closed, the press is opened, and the carriage 4 is displaced downstream again so that the finished board is moved into the unloading station 6 and deposited on the belts 8 and the stack 13 is simultaneously moved up and into position between the platens 10.

The carriage 4 can be divided into an upstream portion provided with the jaws 17 and 18 and a downstream portion with the jaws 15 and 16, with these sections displaceable independently of each other. It is also possible to clamp the stack by its leading and trailing edges instead of or as well as by its longitudinal edges. In such an arrangement sets of jaws are provided on the crosspieces 24 of two separate carriages.

I claim:
1. An apparatus for making a laminate, comprising:
   a press having a pair of rectangular platens having mutually confronting faces, with a pair of opposite short sides and a pair of opposite long sides;
   means for heating said platens;
   a support table adjacent one of the short sides of said press for a stack of sheets;
   a linear guide extending along said support table and said press;
   a carriage displaceable along said guide parallel to said long sides of said press;
   two spaced-apart pairs of first jaws on said carriage for gripping said stack along two opposite edges;
   two spaced apart pairs of second jaws on said carriage rearwardly of said first jaws for engagement with a stack on said support table while said first jaws engage a stack in said press;
   means for displacing said carriage along said guide in a transport direction for transporting said stacks by their edges between and from said platens, said jaws of each pair being spaced apart transverse to said direction by a distance greater than the width of said faces transverse to said direction; and
   means for closing said platens on a stack between them while same is held by said first jaws for pressing said stack together.

2. The apparatus defined in claim 1 wherein each of said pairs of jaws comprises an upper jaw elongated in said direction and a lower jaw therebelow and parallel thereto and also elongated in said direction.

3. The apparatus defined in claim 2 wherein said lower jaw is displaceable and said upper jaw is fixed on said carriage.

4. The apparatus defined in claim 1 wherein said table has a width transverse to said direction smaller than the distance said jaws are spaced apart.

5. The apparatus defined in claim 1, further comprising control means operatively coupling said means for gripping the stack with said means for closing said platens.

6. The apparatus defined in claim 1 wherein said platens have recesses at their opposite edges receiving said jaws.

* * * * *